United States Patent
Baek et al.

(10) Patent No.: US 12,050,515 B2
(45) Date of Patent: Jul. 30, 2024

(54) MEMORY, CONTROLLER AND COMPUTING SYSTEM CAPABLE OF REDUCING POWER CONSUMPTION

(71) Applicant: SK hynix Inc., Icheon-si (KR)

(72) Inventors: Jin Ho Baek, Icheon-si (KR); Young Pyo Joo, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/194,511

(22) Filed: Mar. 31, 2023

(65) Prior Publication Data

US 2024/0160525 A1 May 16, 2024

(30) Foreign Application Priority Data

Nov. 10, 2022 (KR) .................. 10-2022-0149187

(51) Int. Cl.
*G11C 29/00* (2006.01)
*G06F 11/07* (2006.01)
*G06F 11/10* (2006.01)

(52) U.S. Cl.
CPC ........ *G06F 11/1068* (2013.01); *G06F 11/076* (2013.01)

(58) Field of Classification Search
CPC .................. G06F 11/1068; G06F 11/076
See application file for complete search history.

(56) References Cited

U.S. PATENT DOCUMENTS

| 10,560,710 B2 * | 2/2020 | Hendry ............... H04N 19/46 |
| 2017/0102993 A1 * | 4/2017 | Hu .................. G11C 7/1006 |
| 2023/0376243 A1 * | 11/2023 | Basu ................ G06F 3/0604 |

FOREIGN PATENT DOCUMENTS

| KR | 10-2009-0019593 A | 2/2009 |
| KR | 10-2020-0034420 A | 3/2020 |
| KR | 10-2021-0147686 A | 12/2021 |

* cited by examiner

*Primary Examiner* — Christine T. Tu (57) ABSTRACT

A computing system comprises a memory and a controller, and the controller is configured to store a first type of data and a second type of data in the memory, to divide the first type of data into a first part and a second part, to generate parity information on the first part and to store the parity information in the memory, and a refresh interval of a region of the memory where the first type of data is stored is larger than a refresh interval of a region of the memory where the second type of data is stored.

20 Claims, 10 Drawing Sheets

MEMORY, CONTROLLER AND COMPUTING SYSTEM CAPABLE OF REDUCING POWER CONSUMPTION

CROSS-REFERENCE TO RELATED APPLICATION

The present application claims priority under 35 U.S.C. § 119(a) to Korean Patent Application No. 10-2022-0149187 filed in the Korean Intellectual Property Office on Nov. 10, 2022, which is incorporated herein by reference in its entirety.

BACKGROUND

1. Technical Field

Various embodiments generally relate to a memory, a controller and a computing system capable of reducing power consumption.

2. Related Art

A memory may include a plurality of memory cells, and may store data by a write operation and may perform an erase operation on the plurality of memory cells. Each of the plurality of memory cells may include, for example, a transistor that operates according to a driving signal and a capacitor that stores charge. The memory cell may store data according to charge accumulated in the capacitor.

A leakage current may occur as the duration in which data is stored in the memory cell increases. Since stored data may be lost due to the leakage current, a refresh operation may be performed to periodically compensate for the leakage current of the capacitor. Although loss of data may be prevented through the refresh operation, the periodic refresh operation increases the power consumption of the device.

SUMMARY

Various embodiments are directed to providing measures capable of reducing an increase in power consumption of a memory due to a refresh operation while preventing a decrease in reliability due to an error rate of data stored in the memory.

In an embodiment, a computing system may include: a memory; and a controller configured to store a first type of data and a second type of data in the memory, to divide the first type of data into a first part and a second part, to generate parity information on the first part and to store the parity information in the memory, and a refresh interval of a region of the memory where the first type of data is stored is larger than a refresh interval of a region of the memory where the second type of data is stored.

In an embodiment, a controller may include: a data divider configured to identify a first type of data and a second type of data according to an identification information inputted from an outside, and to divide the first type of data into a first part and a second part; a first error correction circuit configured to generate parity information on the first part of the first type of data; and a refresh scheduler configured to control a refresh interval of a region where the first type of data is stored differently from a refresh interval of a region where the second type of data is stored.

In an embodiment, a memory may include: a first data region in which a first type of data divided into an integer part and a decimal part is stored, and on which a refresh operation is performed according to a first refresh interval; a second data region in which a second type of data different from the first type of data is stored, and on which a refresh operation is performed according to a second refresh interval smaller than the first refresh interval; and a parity region configured to store parity information on the integer part of the first type of data.

According to the embodiments of the disclosed technology, generation of parity information is adjusted according to the type of data to be stored in a memory, and a refresh interval of a region where the corresponding data is stored is increased, thereby reducing power consumption of a device while preventing a decrease in reliability due to an error rate of data.

DETAILED DESCRIPTION

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure unclear. It is to be noticed that the terms "comprising," "having," "including" and so on, used in the description and claims, should not be interpreted as being restricted to the means listed thereafter unless specifically stated otherwise. Where an indefinite or definite article is used when referring to a singular noun, e.g., "a," "an" and "the," this may include a plural of that noun unless specifically stated otherwise.

Also, in describing the components of the disclosure, there may be terms used like first, second, A, B, (a), and (b). These are solely for the purpose of differentiating one component from another component but do not limit the substances, order, sequence or number of the components.

In descriptions for the positional relationships of components, where it is described that at least two components are "connected," "coupled" or "linked," it is to be understood that the at least two components may be directly "connected," "coupled" or "linked" but may be indirectly "connected," "coupled" or "linked" with another component interposed between the two components. Here, another component may be included in at least one of the at least two components which are "connected," "coupled" or "linked" with each other.

In descriptions for time flow relationships of components, an operating method or a fabricating method, where pre and post relationships in terms of time or pre and post relationships in terms of flow are described, for example, by "after," "following," "next" or "before," non-continuous cases may be included unless "immediately" or "directly" is used.

When a numerical value for a component or its corresponding information (e.g., level, etc.) is mentioned, even though there is no separate explicit description, the numerical value or its corresponding information can be interpreted as including an error range that may be caused by various factors (for example, a process variable, an internal or external shock, noise, etc.).

Hereinafter, various embodiments of the disclosed technology will be described in detail with reference to the accompanying drawings.

Figure 1:
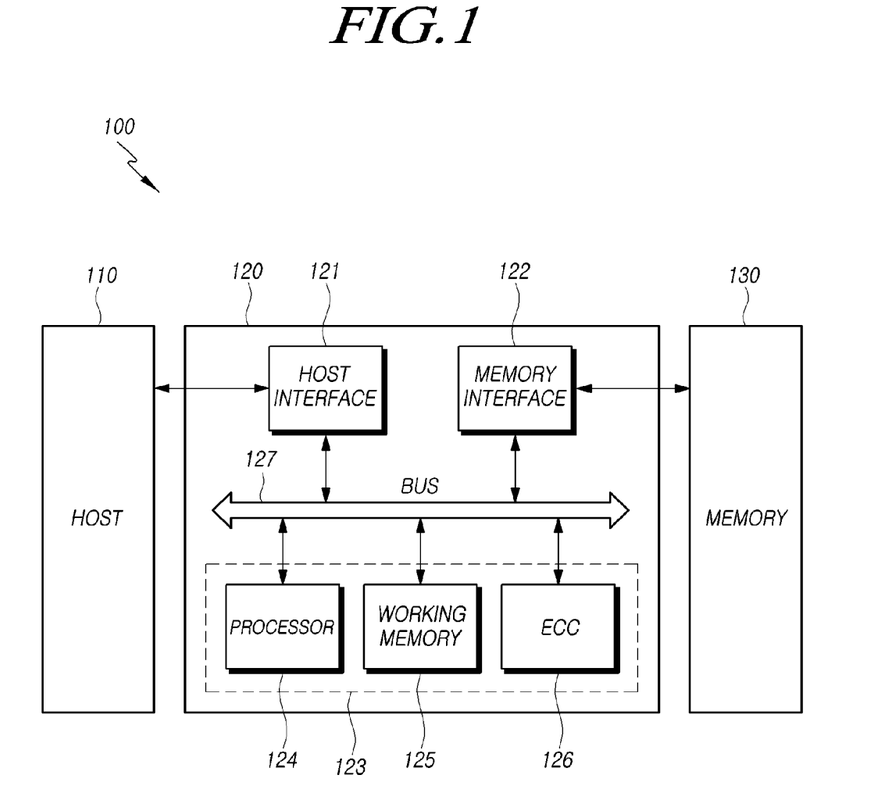
FIG. 1 is a schematic configuration diagram of a computing system according to an embodiment of the disclosure.

FIG. 1 is a schematic configuration diagram of a computing system according to an embodiment of the disclosure.

Referring to FIG. 1, a computing system 100 may include a host 110, a controller 120 and a memory 130. The controller 120 and the memory 130 may be collectively referred to as the computing system 100.

The memory 130 may include a plurality of memory blocks, and may operate in response to the control of the controller 120. Operations of the memory 130 may include, for example, a read operation, a write operation (also referred to as a "program operation"), and an erase operation.

The memory 130 may include a memory cell array including a plurality of memory cells (simply referred to as "cells") that store data. The memory cell array may exist in a memory block.

The memory 130 may be a volatile memory or a nonvolatile memory, as the case may be.

The memory 130 may receive a command and an address from the controller 120 and may access an area that is selected by the address in the memory cell array. The memory 130 may perform an operation indicated by the command, on the area selected by the address.

For example, the memory 130 may perform a write operation, a read operation and an erase operation.

The controller 120 may control write (program), read, erase and background operations for the memory 130. For example, background operations may include at least one of a garbage collection (GC) operation, a wear-leveling (WL) operation, a read reclaim (RR) operation, a bad block management (BBM) operation, and so forth.

The controller 120 may control the operation of the memory 130 according to a request from a device (e.g., the host 110) located outside. Also, the controller 120 may control the operation of the memory 130 without a request from the host 110.

The host 110 may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of driving under human control or autonomous driving, etc.

The host 110 may include at least one operating system. The operating system may generally manage and control the function and operation of the host 110, and may provide interoperability between the host 110 and the controller 120. The operating system may be classified into a general operating system and a mobile operating system depending on the mobility of the host 110.

The controller 120 and the host 110 may be devices that are separated from each other. The controller 120 and the host 110 may be implemented by being integrated into one device. For the sake of convenience in explanation, descriptions below describe an example in which the controller 120 and the host 110 are devices that are separated from each other.

Referring to FIG. 1, the controller 120 may include a memory interface 122 and a control circuit 123, and may further include a host interface 121.

The host interface 121 provides an interface for communication with the host 110. For example, the host interface 121 provides an interface that uses at least one from among various interface protocols such as a USB (Universal Serial Bus) protocol, an MMC (multimedia card) protocol, a PCI (Peripheral Component Interconnection) protocol, a PCI-E (PCI-express) protocol, an ATA (Advanced Technology Attachment) protocol, a serial-ATA protocol, a parallel-ATA protocol, an SCSI (Small Computer System Interface) protocol, an ESDI (Enhanced Small Disk Interface) protocol, an IDE (Integrated Drive Electronics) protocol, an SMBus (System Management Bus) protocol, an I2C (Inter-Integrated Circuit) protocol, an I3C (Improved Inter-Integrated Circuit) protocol and a private protocol.

The memory interface 122 may be coupled with the memory 130 and may provide an interface for communication with the memory 130. The memory interface 122 may be configured to provide an interface between the memory 130 and the controller 120 in response to the control of the control circuit 123.

When receiving a command from the host 110, the control circuit 123 may receive the command through the host interface 121, and may perform an operation of processing the received command.

The control circuit 123 performs general control operations of the controller 120 to control the operation of the memory 130. For instance, the control circuit 123 may include at least one of a processor 124 and a working memory 125, and may optionally include an error correction circuit (ECC circuit) 126.

The processor 124 may control the general operation of the controller 120, and may perform a logic calculation. The processor 124 may communicate with the host 110 through the host interface 121, and may communicate with the memory 130 through the memory interface 122.

The processor 124 may perform the function of a flash translation layer (FTL). The processor 124 may translate a logical block address (LBA), provided by the host 110, into a physical block address (PBA) through the flash translation layer (FTL). The flash translation layer (FTL) may receive the logical block address (LBA) and translate it into the physical block address (PBA), by using a mapping table.

The flash translation layer may use various address mapping methods depending on a mapping unit. Representative address mapping methods include a page mapping method, a block mapping method and a hybrid mapping method.

The processor 124 may randomize data received from the host 110. For example, the processor 124 may randomize data received from the host 110, by using a set randomizing seed. The randomized data may be provided to the memory 130, and may be programmed to a memory cell array of the memory 130.

In a read operation, the processor 124 may derandomize data received from the memory 130. For example, the processor 124 may derandomize data received from the memory 130 using a derandomizing seed. The derandomized data may be outputted to the host 110.

The processor 124 may execute firmware to control the operation of the controller 120. In order to control the general operation of the controller 120 and perform a logic calculation, the processor 124 may execute (drive) firmware loaded in the working memory 125 upon booting.

The working memory 125 may store firmware, a program code, a command and data, which are necessary to drive the controller 120. A working memory 125 may be, for example, a volatile memory that includes at least one among an SRAM (static RAM), a DRAM (dynamic RAM) and an SDRAM (synchronous DRAM).

The error correction circuit 126 may detect an error bit of target data and correct the detected error bit, by using an error correction code. The target data may be, for example, data stored in the working memory 125 or data read from the memory 130.

The error correction circuit 126 may be implemented to decode data by using the error correction code. The error correction circuit 126 may be implemented by various code decoders. For example, a decoder that performs unsystematic code decoding or a decoder that performs systematic code decoding may be used.

For example, the error correction circuit 126 may detect an error bit by the unit of a set sector in each of read data. Each read data may be constituted by a plurality of sectors. The sector may mean a data unit that is smaller than a page, which is a read unit of a flash memory. Sectors constituting each read data may be matched with one another using an address.

The error correction circuit 126 may calculate a bit error rate (BER), and may determine whether an error is correctable or not, by units of sectors. For example, when a bit error rate (BER) is higher than a set specific value, the error correction circuit 126 may determine that a corresponding sector is uncorrectable or a fail. On the other hand, when a bit error rate (BER) is lower than the set specific value, the error correction circuit 126 may determine that a corresponding sector is correctable or a pass.

The error correction circuit 126 may perform an error detection and correction operation sequentially for all read data. When a sector included in read data is correctable, the error correction circuit 126 may omit an error detection and correction operation for a corresponding sector for next read data. When the error detection and correction operation for all read data is ended in this way, then the error correction circuit 126 may detect an uncorrectable sector. There may be one or more sectors that are determined to be uncorrectable. The error correction circuit 126 may transfer information (e.g., address information) regarding a sector which is determined to be uncorrectable, to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some of the components among the above-described components 121, 122, 124, 125 and 126 of the controller 120 may be omitted, or some of the components among the above-described components 121, 122, 124, 125 and 126 of the controller 120 may be integrated into one component. In other embodiments, one or more other components may be added in addition to the above-described components 121, 122, 124, 125 and 126 of the controller 120.

In a process in which the controller 120 stores data in the memory 130, the error correction circuit 126 may generate parity information on the basis of the data and store the parity information in the memory 130.

Figure 2:
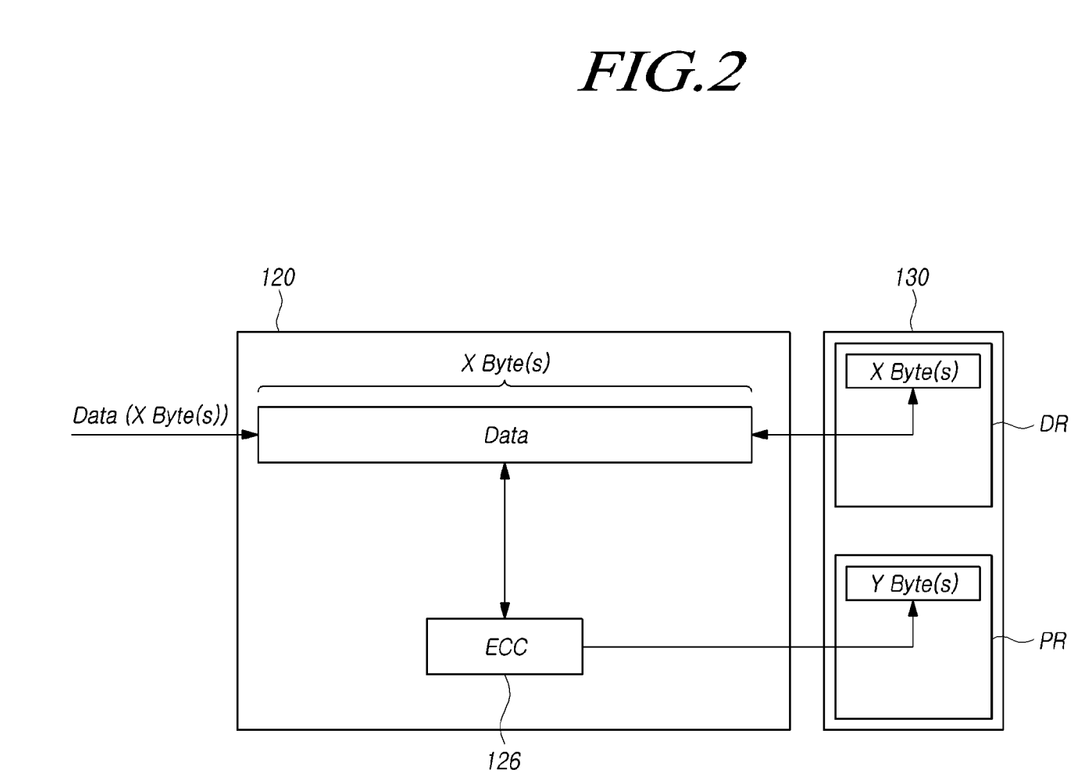
FIG. 2 is a diagram illustrating a method of storing data and parity information in a memory in a computing system according to an embodiment of the disclosure.

FIG. 2 is a diagram illustrating a method of storing data and parity information in a memory in a computing system according to an embodiment of the disclosure.

Referring to FIG. 2, a controller 120 may store data in a memory 130 according to a command inputted from the outside. FIG. 2 illustrates an example in which the controller 120 stores data of X-bytes in a data region DR of the memory 130.

An error correction circuit 126 included in the controller 120 may generate parity information corresponding to the data stored in the data region DR, and may store the parity information in a parity region PR of the memory 130. The size of the parity information may be, for example, Y bytes.

The parity information may be information that may be used to recover the corresponding data, when data stored in the memory 130 is lost.

The size of the parity information may be smaller than the size of the corresponding data. A parity ratio between the size of the data and the size of the parity information may vary, and parity ratio examples may include, without limitation, 8:1 or 4:1.

The controller 120 may store the parity information of a size smaller than the data in the memory 130, and may use the parity information to recover the corresponding data when the data is lost.

The controller 120 may store the parity information generated by the error correction circuit 126, and may increase the refresh interval of a region where the data corresponding to the parity information is stored. As a result, the controller 120 may reduce the power consumption of the computing system 100 without increasing the error rate of the stored data or minimizing an increase in the error rate.

The controller 120 may diversify data whose parity information is generated by the error correction circuit 126 or may modify a region whose refresh interval is adjusted, depending on the type of the data, thereby reducing power consumption while maintaining reliability of the data stored in the memory 130.

FIGS. 3 to 6 are diagrams illustrating examples of methods of storing data and parity information in a memory of a computing system and controlling a refresh operation on a region where the data is stored according to an embodiment of the disclosure.

Figure 3:
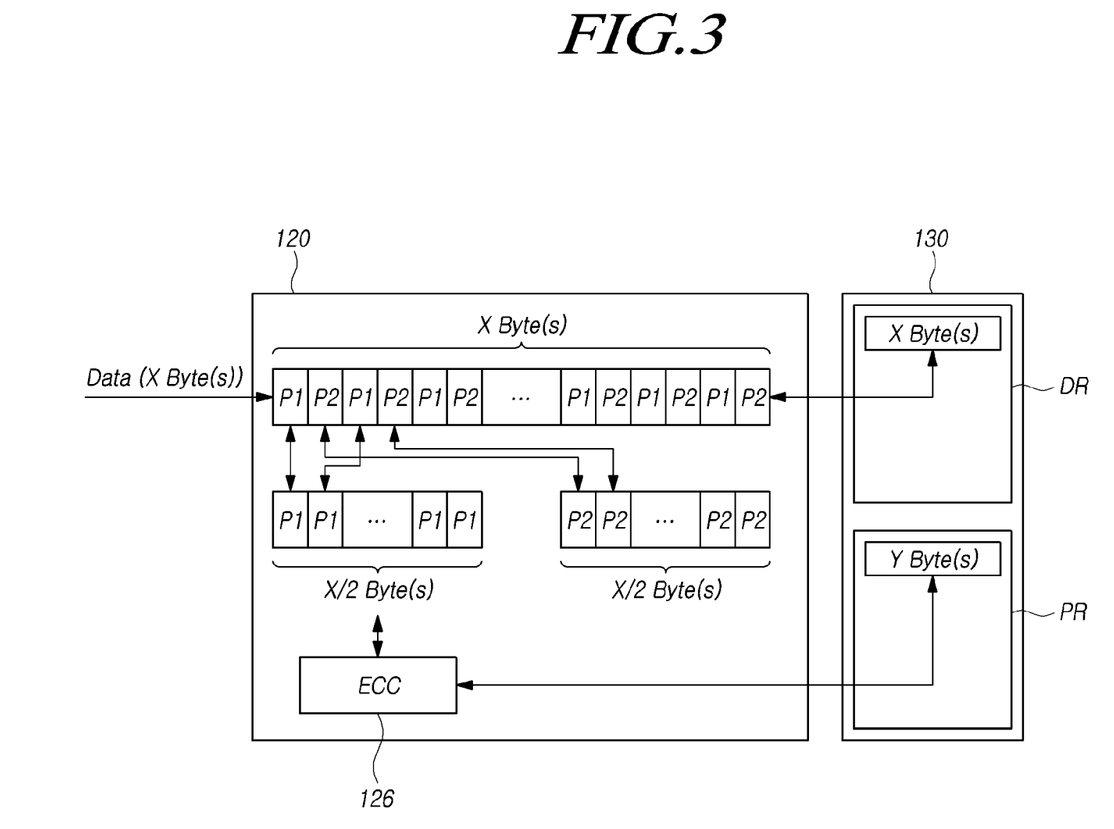
FIGS. 3 to 6 are diagrams illustrating examples of methods of storing data and parity information in a memory of a computing system and controlling a refresh operation on a region where the data is stored according to an embodiment of the disclosure.

Referring to FIG. 3, a controller 120 may divide data into two or more parts depending on the type of data. The controller 120 may generate parity information for only a portion of the two or more parts.

For example, the controller 120 may divide data into a first part P1 and a second part P2. The first part P1 may be upper data, and the second part P2 may be lower data.

An error correction circuit 126 of the controller 120 may generate parity information on the first part P1 of the data. The error correction circuit 126 may not generate parity information on the second part P2 of the data.

The controller 120 may store the data in the data region DR of a memory 130. The controller 120 may store the parity information on the first part P1 of the data in the parity region PR of the memory 130.

Parity information may be generated on only a part of data, and a refresh interval for the data region DR where the corresponding data is stored may be increased. By increasing the refresh interval, power consumption due to a refresh operation may be reduced.

Even if the first part P1 of the data whose parity information is stored is lost, the first part P1 of the data may be recovered by the parity information, and thus, reliability of the corresponding data may be maintained. When the second part P2 of the data whose parity information is not stored is lost, the second part P2 of the data may be difficult to recover. However, by classifying a part of the data with relatively low importance as the second part P2, it is possible to lower the decrease in the reliability of the corresponding data.

Data, which may be divided into the first part P1 and the second part P2 as described above, may be for example floating point data. The first part P1 of the data may be an integer part of the floating point data. The second part P2 of the data may be a decimal part of the floating point data.

Since the parity information on the integer part of the floating point data with higher importance is generated and stored and the refresh interval increased, the reliability of the integer part may be maintained. The reliability of the floating point data may be maintained at a predetermined level, and power consumption may be reduced according to a decrease in the number of refresh operations.

Also, by increasing a parity ratio applied to the first part P1 of the data by the error correction circuit 126, it is possible to prevent an increase in the error rate of the data while reducing power consumption.

Figure 4:
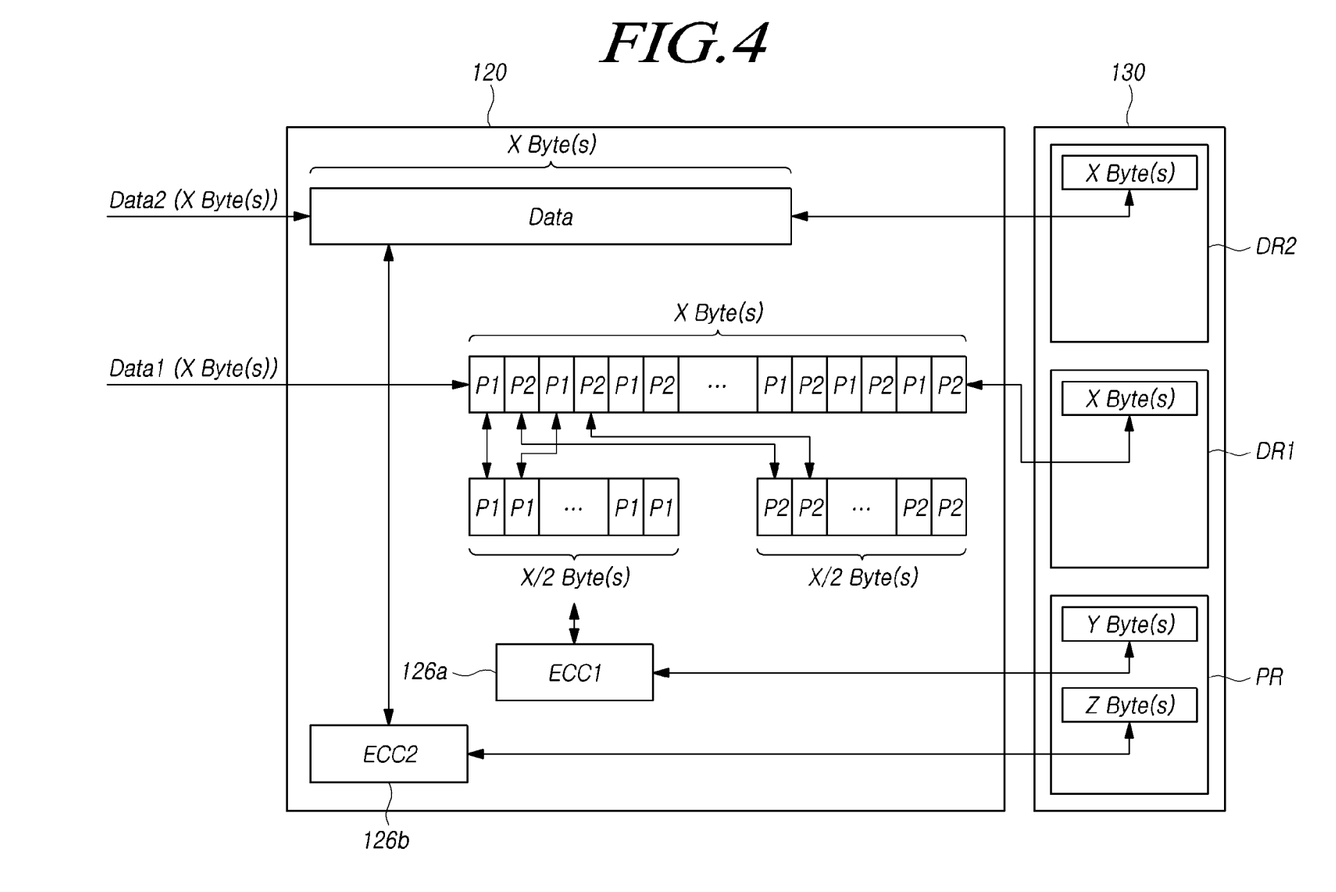

Referring to FIG. 4, the controller 120 may perform an operation of storing a first type of data Data1 and a second type of data Data2 in the memory 130.

The first type of data Data1 may be, for example, data that is divided into upper data and lower data, such as in the floating point data example described above. The second type of data Data2 may mean data other than the first type of data Data1.

The controller 120 may include a first error correction circuit 126a, which generates parity information on the first type of data Data1. The controller 120 may include a second error correction circuit 126b, which generates parity information on the second type of data Data2.

A parity ratio of the parity information generated by the first error correction circuit 126a may be different from a parity ratio of the parity information generated by the second error correction circuit 126b.

For example, when storing the first type of data Data1, the controller 120 may divide the first type of data Data1 into a first part P1 and a second part P2.

The first error correction circuit 126a may generate the parity information on the first type of data Data1. The first error correction circuit 126a may generate only parity information on the first part P1 of the first type of data Data1. The first error correction circuit 126a may not generate parity information on the second part P2 of the first type of data Data1.

The second error correction circuit 126b may generate the parity information on the second type of data Data2.

A parity ratio of the parity information generated by the second error correction circuit 126b may be smaller than a parity ratio of the parity information generated by the first error correction circuit 126a.

For example, a parity ratio generated by the second error correction circuit 126b may be 8:1, and a parity ratio generated by the first error correction circuit 126a may be 4:1.

When the size of each of the first type of data Data1 and the second type of data Data2 is X bytes, the first error correction circuit 126a may generate Y bytes of parity information. The size of the parity information generated by the first error correction circuit 126a may be X/8 bytes, which is one-quarter (¼) of X/2 bytes. The parity information generated by the second error correction circuit 126b may be Z bytes. The size of the parity information generated by the second error correction circuit 126b may be X/8 bytes, which is one-eighth (⅛) of X bytes.

The first type of data Data1 may be stored in a first data region DR1 of the memory 130. The second type of data Data2 may be stored in a second data region DR2 of the memory 130.

The refresh interval of the first data region DR1 may be larger than the refresh interval of the second data region DR2. In the first data region DR1, a region where the first part P1 of the first type of data Data1 is stored and a region where the second part P2 of the first type of data Data1 is stored may have the same refresh intervals. The refresh intervals of the regions in the first data region DR1 may be larger than the refresh interval of the second data region DR2.

Even though the refresh interval of the first data region DR1 is increased, since the parity information generated by the first error correction circuit 126a with a high parity ratio for the first part P1 of the first type of data Data1 is stored, the reliability of the corresponding data may be maintained. Since the number of refresh operations decreases due to an increase in a refresh interval for the first data region DR1, overall power consumption may be reduced.

As such, since the first and second error correction circuits 126a and 126b, which generate different parity ratios, are used depending on the type of data, and since a refresh interval for the first data region DR1 where corresponding data is stored is increased, power consumption may be reduced while maintaining the reliability of the data.

An error correction circuit having a different parity ratio may be applied to the second part P2 of the first type of data Data1 to store parity information on the second part P2.

Figure 5:
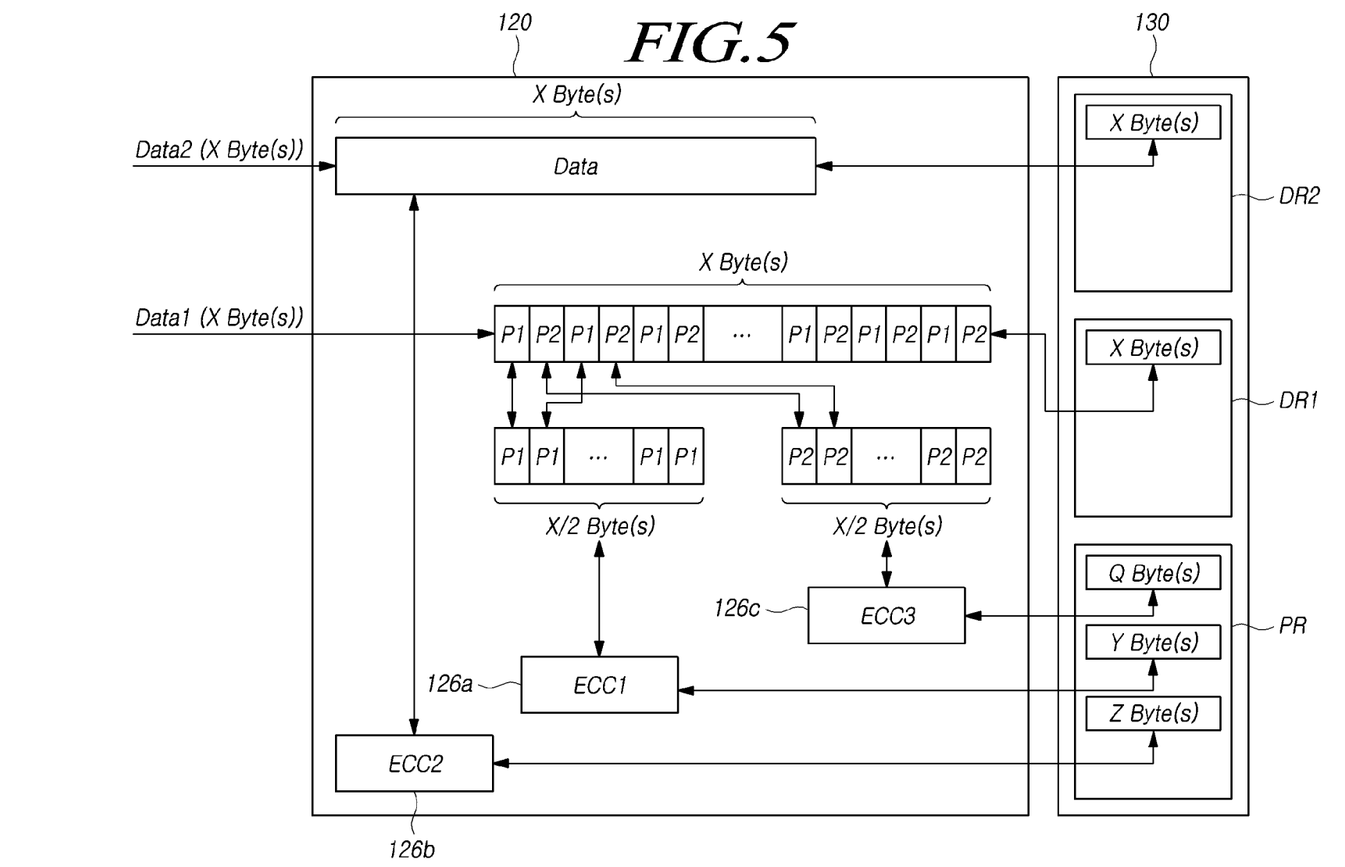

Referring to FIG. 5, the controller 120 may perform an operation of storing the first type of data Data1 and the second type of data Data2 in the memory 130.

The controller 120 may divide the first type of data Data1 into a first part P1 and a second part P2. The controller 120 may apply different error correction circuits to the first part P1 and the second part P2 of the first type of data Data1. The controller 120 may apply an error correction circuit, different from the error correction circuits applied to the first type of data Data1, to the second type of data Data2.

For example, the controller 120 may include a first error correction circuit 126a, a second error correction circuit 126b and a third error correction circuit 126c.

A parity ratio generated by the first error correction circuit 126a may be higher than a parity ratio generated by the second error correction circuit 126b. A parity ratio generated by the third error correction circuit 126c may be lower than the parity ratio generated by the first error correction circuit 126a. The parity ratio generated by the third error correction circuit 126c may be equal to or lower than the parity ratio generated by the second error correction circuit 126b. In some instances, the parity ratio generated by the third error correction circuit 126c may be higher than the parity ratio generated by the second error correction circuit 126b and lower than the parity ratio generated by the first error correction circuit 126a.

Parity information on the first part P1 of the first type of data Data1 may be generated by the first error correction circuit 126a. Y-byte parity information on the first part P1 may be stored in a parity region PR of the memory 130.

Parity information on the second type of data Data2 may be generated by the second error correction circuit 126b. Z-byte parity information on the second type of data Data2 may be stored in the parity region PR of the memory 130.

Parity information on the second part P2 of the first type of data Data1 may be generated by the third error correction circuit 126c. Q-byte parity information on the second part P2 may be stored in the parity region PR of the memory 130.

The first error correction circuit 126a with a high parity ratio may be applied to the first part P1 of the first type of data Data1, with has a higher importance. The third error correction circuit 126c with a low parity ratio may be applied to the second part P2 of the first type of data Data1, which has lower importance.

Even though error correction circuits having different parity ratios are used, since the first error correction circuit 126a having a high parity ratio is applied to the first part P1, the refresh interval of a first data region DR1 where the first type of data Data1 is stored may be increased and may be longer than the refresh interval of a second data region DR2 where the second type of data Data2 is stored.

Since the third error correction circuit 126c having a low parity ratio is applied to the second part P2, the refresh interval of the first data region DR1 may be further increased as compared to a case in which the parity information on the second part P2 is not generated.

By further reducing the number of refresh operations on the first data region DR1, overall power consumption may be reduced.

Regardless of whether an error correction circuit is applied to the second part P2 of the first type of data Data1, the refresh intervals of regions where the first part P1 and the second part P2 are stored may be differently controlled.

Figure 6:
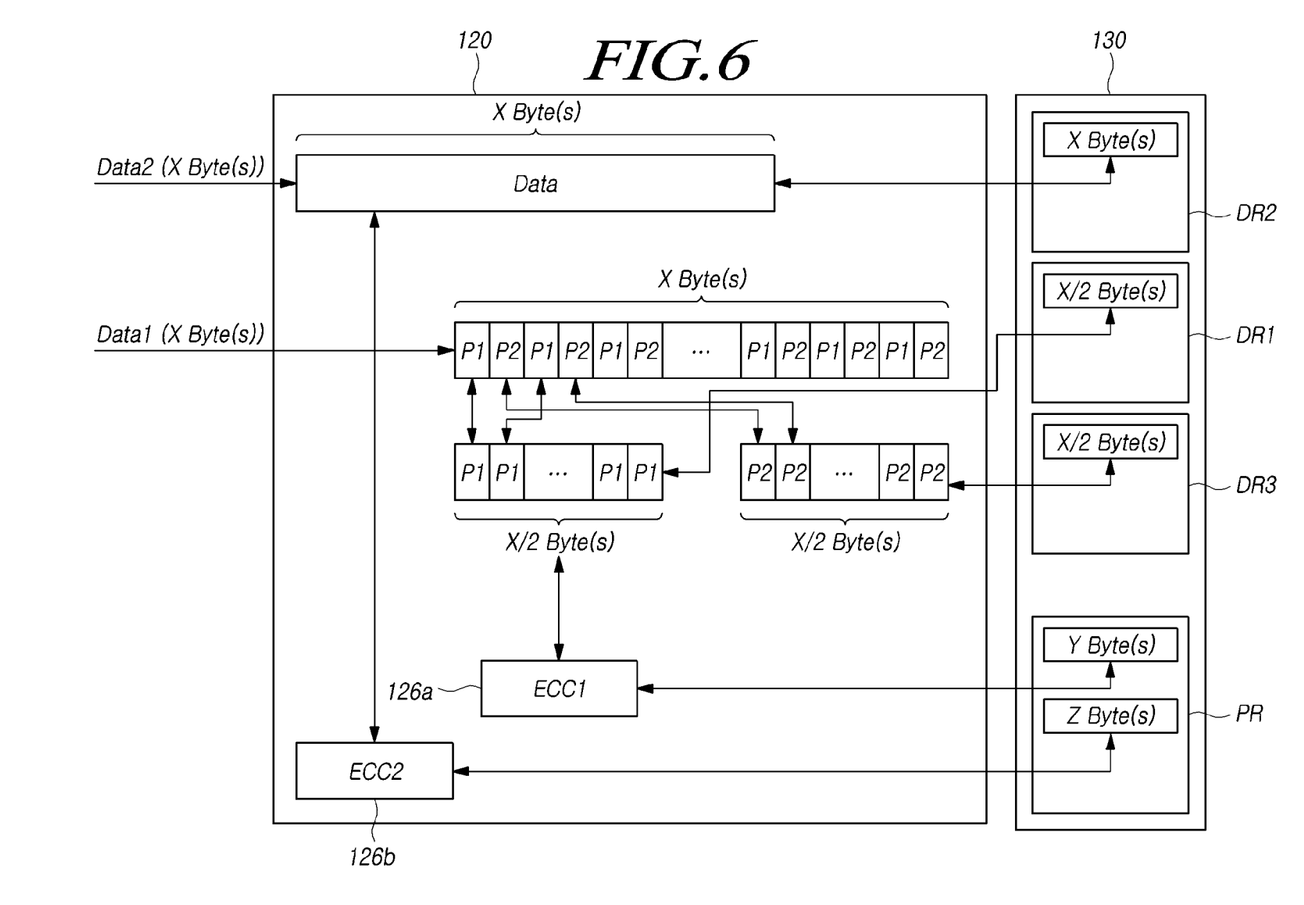

Referring to FIG. 6, the controller 120 may divide the first type of data Data1 into a first part P1 and a second part P2.

Parity information on the first part P1 of the first type of data Data1 may be generated by a first error correction circuit 126a. Parity information on the second part P2 of the first type of data Data1 may not be generated by the first error correction circuit 126a.

Parity information on second type of data Data2 may be generated by a second error correction circuit 126b.

The parity ratio of the first error correction circuit 126a may be higher than the parity ratio of the second error correction circuit 126b.

The controller 120 may store the first part P1 of the first type of data Data1 in a first data region DR1 of the memory 130. The controller 120 may store the second type of data Data2 in a second data region DR2 of the memory 130. The controller 120 may store the second part P2 of the first type of data Data1 in a third data region DR3 of the memory 130.

The refresh interval of the first data region DR1 may be larger than the refresh interval of the second data region DR2. The refresh interval of the third data region DR3 may be larger than the refresh interval of the second data region DR2. The refresh interval of the third data region DR3 may be larger than the refresh interval of the first data region DR1.

By further increasing the refresh interval of the third data region DR3, where the second part P2 of the first type of data Data1 is stored, the number of refresh operations may be further reduced.

If the refresh interval of the third data region DR3 where the second part P2 of the first type of data Data1 is stored is increased to be longer than the refresh interval of the first data region DR1 where the first part P1 of the first type of data Data1 is stored, then an error correction circuit may not be applied to the second part P2, or an error correction circuit having a low parity ratio may be applied to the second part P2 as in the example shown in FIG. 5.

Where an error correction circuit is applied to the second part P2 of the first type of data Data1 and an error correction circuit is not applied to the second part P2 of the first type of data Data1, by increasing the refresh interval of the third data region DR3 where the second part P2 is stored, power consumption according to refresh operations may be further reduced.

As such, by applying an error correction circuit in which a parity ratio is partially and differently set depending on the type of data, and by increasing a refresh interval of a data region where corresponding data is stored, power consumption may be reduced according to a decrease in the number of refresh operations while maintaining the reliability of data.

Also, by adjusting a refresh interval differently according to regions where respective parts of data are stored, the number of refresh operations may be further decreased and the effect of reducing power consumption may be enhanced.

Figure 7:
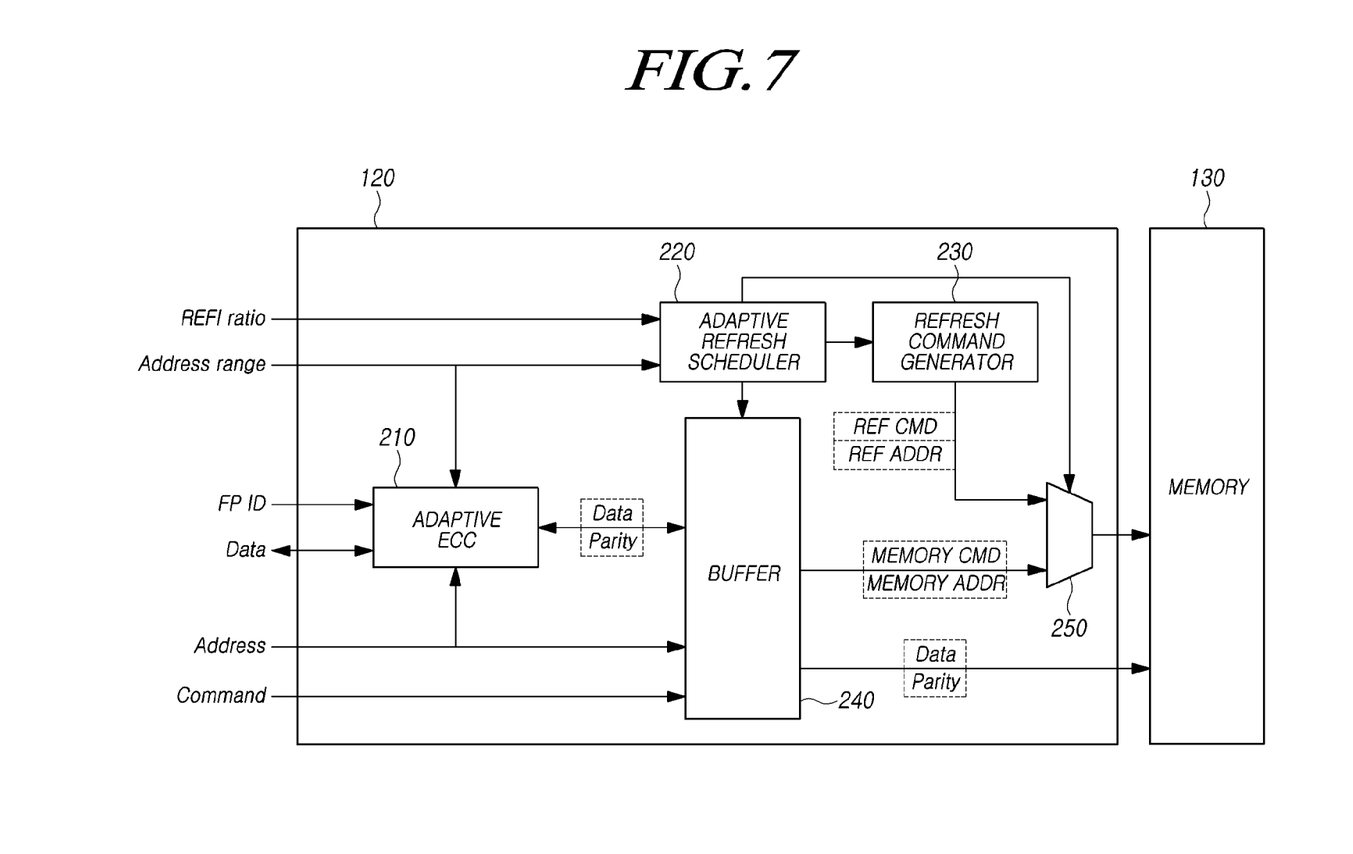
FIG. 7 is a diagram illustrating an example of implementing a controller shown in FIGS. 3 to 6.
Figure 8:
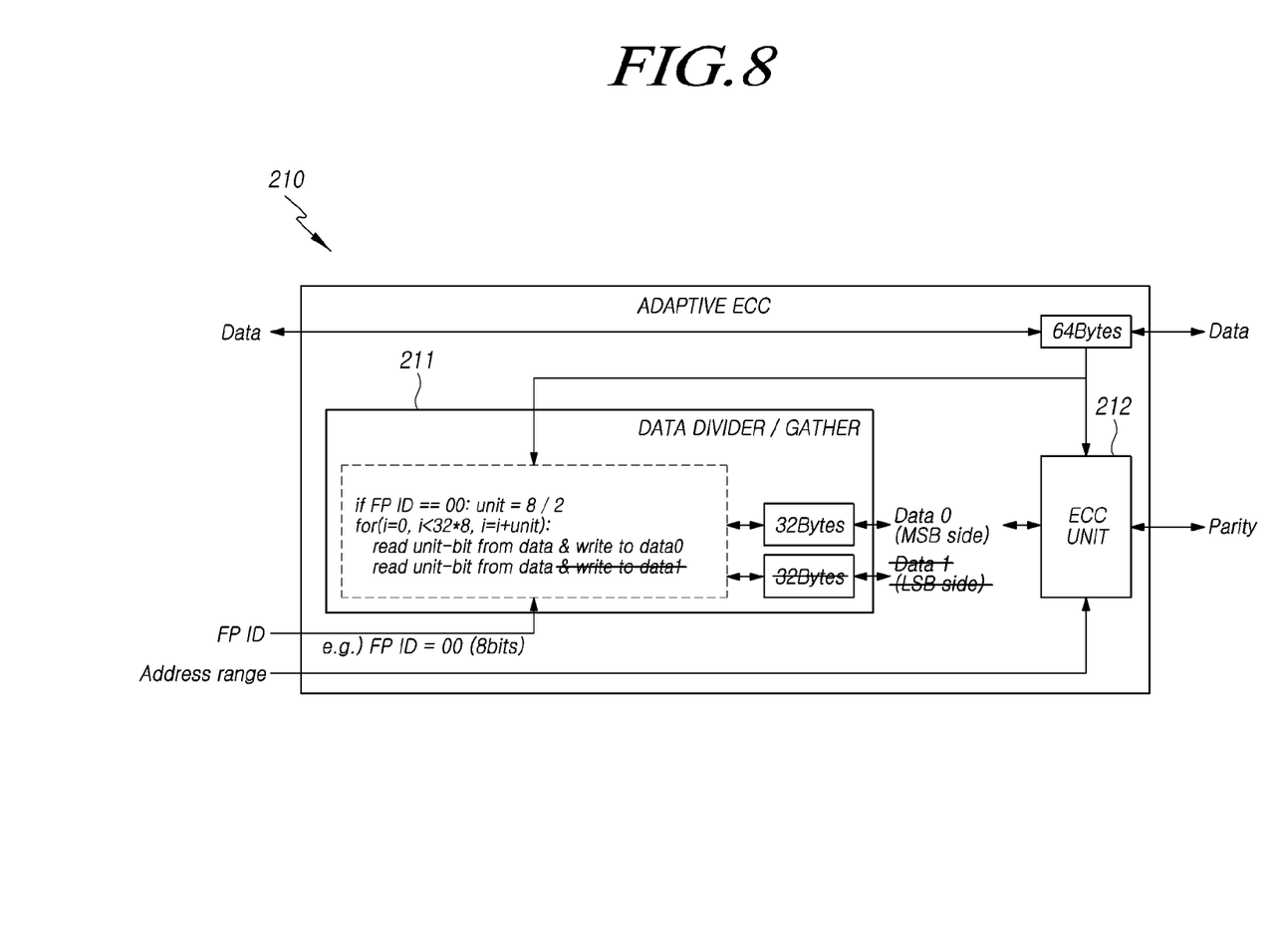
FIG. 8 is a diagram illustrating an example of implementing an adaptive error correction circuit shown in FIG. 7.
Figure 9:
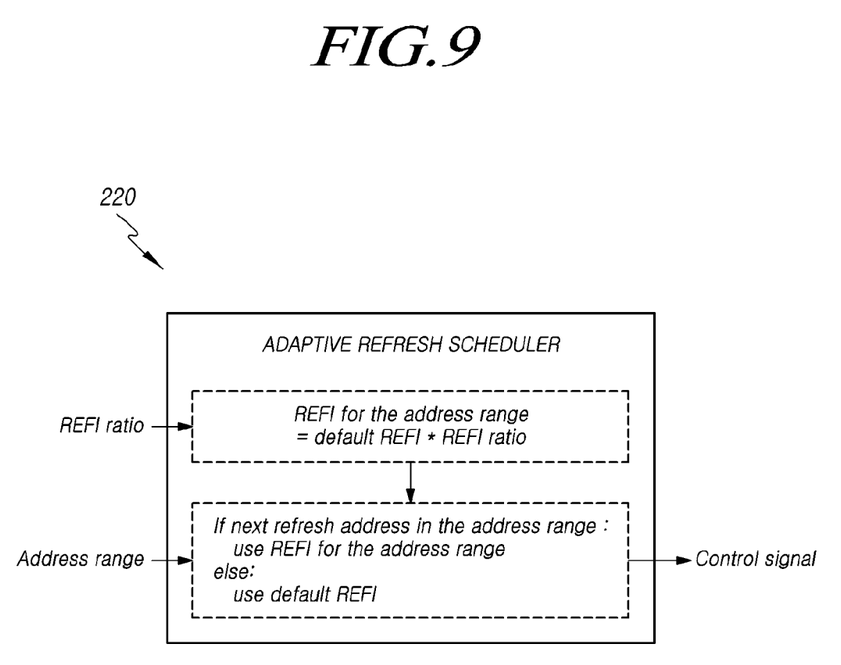
FIG. 9 is a diagram illustrating an example of implementing an adaptive refresh scheduler shown in FIG. 7.

FIG. 7 is a diagram illustrating an example of implementing a controller shown in FIGS. 3 to 6. FIG. 8 is a diagram illustrating an example of implementing an adaptive error correction circuit shown in FIG. 7. FIG. 9 is a diagram illustrating an example of implementing an adaptive refresh scheduler shown in FIG. 7.

Referring to FIG. 7, a controller 120 may include an adaptive error correction circuit 210, an adaptive refresh scheduler 220, a refresh command generator 230, a buffer memory 240, and an output unit 250.

The controller 120 may receive identification information FP ID according to data, a refresh interval ratio REFI ratio and address range information Address range in addition to information on a command and an address inputted from the outside.

The identification information FP ID may be information indicating a type of data or a size of data. The refresh interval ratio REFI ratio as a ratio to a baseline set refresh interval may mean a ratio that increases a refresh interval. The address range information Address range may be information indicating an address range in which a refresh interval is changed.

The adaptive error correction circuit 210 may receive the identification information FP ID and data inputted from the outside, and may control whether to generate parity information on the corresponding data.

For example, referring to FIGS. 7 and 8, the adaptive error correction circuit 210 may include a data divider 211 and an error correction control unit 212.

The data divider 211 may divide data into respective parts according to the identification information FP ID inputted from the outside.

For example, where a first type of data is floating point data, the identification information FP ID may be information indicating whether inputted data is floating point data. Also, the identification information FP ID may be information indicating the size of floating point data.

When the identification information FP ID is 2 bits, '00,' '01,' '10' and '11' may respectively indicate cases where floating point data is 8 bits, 16 bits, 32 bits and 64 bits. Alternatively, '00' of the identification information FP ID may indicate a non-floating point data, and the remaining identification information FP ID may indicate the size of the floating point data.

The data divider 211 may divide inputted data into a first part P1 and a second part P2 on the basis of the identification information FP ID. For example, when the size of floating point data is 8 bits, the floating point data is divided into a most significant bit side and a least significant bit side each of 4 bits. Thus, the floating point data is divided into a first part P1 (Data 0 shown in FIG. 8) and a second part P2 (Data 1 shown in FIG. 8).

The data divider 211 may transfer only Data 0 corresponding to the first part P1 of the divided parts of the data to the error correction control unit 212.

The error correction control unit 212 may generate and output parity information on the first part P1 of the floating point data corresponding to the most significant bit side. Parity information on the second part P2 of the floating point data corresponding to the least significant bit side may not be generated. The adaptive error correction circuit 210 may include a plurality of error correction control units 212 having different parity ratios, and may provide parity information on the most significant bit side and the least significant bit side of the floating point data.

Data and parity information outputted by the adaptive error correction circuit 210 may be stored in the buffer memory 240, and then, may be outputted to the memory 130 and be stored in the memory 130.

The controller 120 may control a refresh interval for a data region DR of the memory 130 differently depending on the refresh interval ratio REFI ratio and the address range information Address range inputted from the outside.

For example, referring to FIGS. 7 and 9, the adaptive refresh scheduler 220 may set a refresh interval for a region indicated by the address range information Address range by using the refresh interval ratio REFI ratio inputted from the outside.

When the baseline set refresh interval is a default REFI, the adaptive refresh scheduler 220 may generate a different refresh interval by multiplying the default REFI by the inputted refresh interval ratio REFI ratio.

The adaptive refresh scheduler 220 may output a signal for controlling a refresh operation.

When an address where refresh is performed is in a region indicated by the address range information Address range, the adaptive refresh scheduler 220 may apply a refresh interval generated by applying the refresh interval ratio REFI ratio. When an address where refresh is performed is not in a region indicated by the address range information Address range, the adaptive refresh scheduler 220 may apply the default REFI as the basically set refresh interval.

A region indicated by the address range information Address range may be a region where first type of data such as floating point data is stored. A region not indicated by the address range information Address range may be a region where second type of data is stored.

The adaptive refresh scheduler 220 may provide a control signal for enabling refresh to be performed with different refresh intervals for a region where the first type of data is stored and a region where the second type of data is stored.

The refresh command generator 230 may output information on a refresh interval and an address according to the control signal outputted by the adaptive refresh scheduler 220, and may control refresh to be performed with refresh intervals differently set for respective regions of the memory 130.

Besides floating point data, when data whose error rates may be differently adjusted is inputted, as in the above example, the data may be divided, error correction circuits are applied differently to divided parts, and a refresh interval for a region where corresponding data is stored may be increased. As a result, it is possible to reduce the power consumption of the computing system 100 due to a decrease in the number of refresh operations while preventing a decrease in the reliability of data.

Figure 10:
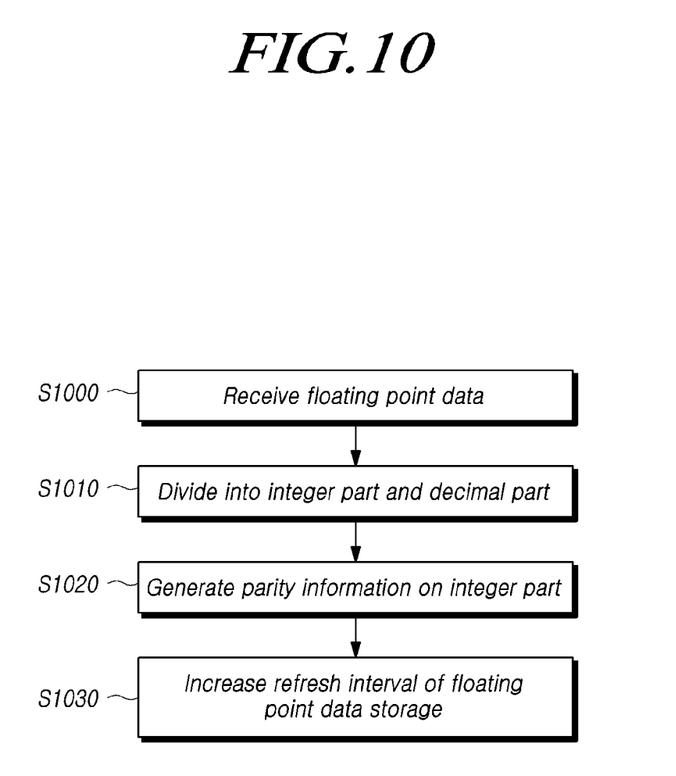
FIG. 10 is a diagram illustrating a method of operating a controller according to an embodiment of the disclosure.

FIG. 10 is a diagram illustrating a method of operating a controller according to an embodiment of the disclosure.

Referring to FIG. 10, a controller 120 may receive floating point data from the outside (S1000).

Upon receiving the floating point data, the controller 120 may divide the floating point data into an integer part and a decimal part on the basis of the identification information FP ID and so forth (S1010).

The controller 120 may apply different error correction circuits to the integer part and the decimal part of the floating point data. For example, the controller 120 may generate parity information on the integer part of the floating point data (S1020). The parity ratio of an error correction circuit applied to the integer part may be higher than the parity ratio of an error correction circuit applied to another type of data.

The controller 120 may not generate parity information on the decimal part of the floating point data. Alternatively, the controller 120 may apply, to the decimal part, an error correction circuit having a parity ratio lower than the parity ratio of the error correction circuit applied to the integer part.

When performing refresh on a region where data is stored in a memory 130, the controller 120 may perform the refresh by increasing the refresh interval of a region where the floating point data is stored (S1030). Refresh on the region where the floating point data is stored may be performed with a refresh interval larger than the refresh interval of a region where another type of data is stored.

Since the error correction circuit having a high parity ratio is applied to the integer part of the floating point data, an increase in the error rate of data may be minimized even though the refresh interval of the region where the integer part is stored is increased. Since the number of refresh operations on the region where the floating point data is stored decreases due to an increase in the refresh interval, power consumption according to the refresh operations may be reduced.

As such, according to embodiments of the disclosed technology, different error correction circuits are applied depending on the type of data, and a refresh interval of a region where corresponding data is stored is increased, thereby reducing power consumption according to refresh operations while maintaining the reliability of data at a predetermined level, thereby improving the efficiency of an entire system.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A computing system comprising:
a memory; and
a controller configured to store a first type of data and a second type of data in the memory, to divide the first type of data into a first part and a second part, to generate parity information on the first part and to store the parity information in the memory, and a refresh interval of a region of the memory where the first type of data is stored is larger than a refresh interval of a region of the memory where the second type of data is stored.

2. The computing system according to claim 1, wherein the controller generates parity information on the second type of data and stores the parity information on the second type of data in the memory, and a parity ratio of the parity information on the first part of the first type of data is larger than a parity ratio of the parity information on the second type of data.

3. The computing system according to claim 1, wherein the controller does not generate parity information on the second part of the first type of data.

4. The computing system according to claim 1, wherein the controller generates parity information on the second part of the first type of data and stores the parity information on the second part in the memory, and a parity ratio of the parity information on the second part is smaller than a parity ratio of the parity information on the first part.

5. The computing system according to claim 4, wherein the controller generates parity information on the second type of data and stores the parity information on the second type of data in the memory, and the parity ratio of the parity information on the second part is equal to or lower than a parity ratio of the parity information on the second type of data.

6. The computing system according to claim 1, wherein a refresh interval of a region where the first part of the first type of data is stored is the same as a refresh interval of a region where the second part of the first type of data is stored.

7. The computing system according to claim 1, wherein a refresh interval of a region where the second part of the first type of data is stored is larger than a refresh interval of a region where the first part of the first type of data is stored.

8. The computing system according to claim 7, wherein the controller does not generate parity information on the second part of the first type of data or generate parity information on the second part of the first type of data according to a parity ratio lower than the parity ratio of the parity information on the first part of the first type of data.

9. The computing system according to claim 1, wherein the first type of data is floating point data, the first part is an integer part, and the second part is a decimal part.

10. The computing system according to claim 1, wherein a size of the first part of the first type of data is the same as a size of the second part of the first type of data.

11. A controller comprising:
a data divider configured to identify a first type of data and a second type of data according to an identification information inputted from an outside, and to divide the first type of data into a first part and a second part;
a first error correction circuit configured to generate parity information on the first part of the first type of data; and
a refresh scheduler configured to control a refresh interval of a region where the first type of data is stored differently from a refresh interval of a region where the second type of data is stored.

12. The controller according to claim 11, wherein the refresh interval of the region where the first type of data is stored is larger than the refresh interval of the region where the second type of data is stored.

13. The controller according to claim 11, further comprising:
a second error correction circuit configured to generate parity information on the second type of data,
wherein a parity ratio of the parity information on the first part of the first type of data is larger than a parity ratio of the parity information on the second type of data.

14. The controller according to claim 13, further comprising:
a third error correction circuit configured to generate parity information on the second part of the first type of data.

15. The controller according to claim 14, wherein a parity ratio of the parity information on the second part of the first type of data is smaller than the parity ratio of the parity information on the first part of the first type of data.

16. A memory comprising:
a first data region in which a first type of data divided into an integer part and a decimal part is stored, and on which a refresh operation is performed according to a first refresh interval;
a second data region in which a second type of data different from the first type of data is stored, and on which a refresh operation is performed according to a second refresh interval smaller than the first refresh interval; and
a parity region configured to store parity information on the integer part of the first type of data.

17. The memory according to claim 16, wherein parity information on the second type of data is stored in the parity region, and a parity ratio of the parity information on the integer part of the first type of data is larger than a parity ratio of the parity information on the second type of data.

18. The memory according to claim 16, wherein parity information on the decimal part of the first type of data is not stored in the parity region.

19. The memory according to claim 16, wherein parity information on the decimal part of the first type of data is stored in the parity region, and a parity ratio of the parity information on the decimal part is smaller than the parity ratio of the parity information on the integer part.

20. The memory according to claim 16, wherein, in the first data region, a refresh interval of a region where the integer part of the first type of data is stored is smaller than a refresh interval of a region where the decimal part of the first type of data is stored.

* * * * *